Figure 1:
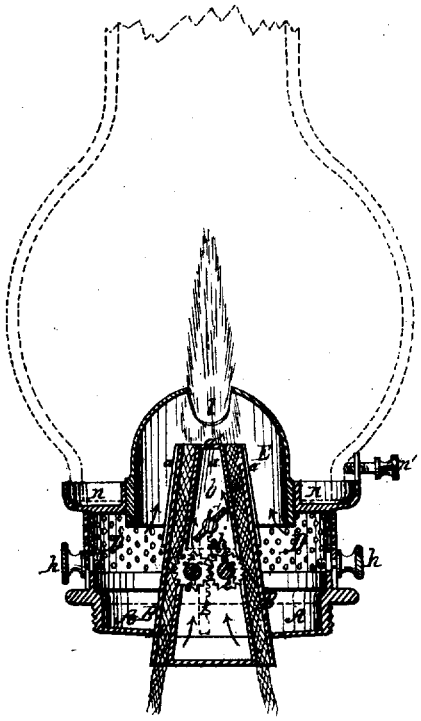

H. HALVORSON.

Improvement in Lamps.

No. 4,413. Reissued June 6, 1871.

WITNESSES.

David A. Alden

C C Wilson

Rufus S. Mercer
assignee of Halvor Halvorson
by his attorney
A Bowker

A.M. PHOTO-LITHOGRAPHIC CO. N.Y. (OSBORNE'S PROCESS.)

UNITED STATES PATENT OFFICE.

HALVOR HALVORSON, OF NASHUA, NEW HAMPSHIRE, ASSIGNOR TO RUFUS S. MERRILL.

IMPROVEMENT IN LAMPS.

Specification forming part of Letters Patent No. 25,506, dated September 20, 1859; reissue No. 4,413, dated June 6, 1871.

*To all whom it may concern:*

Be it known that I, HALVOR HALVORSON, formerly of Cambridge, Massachusetts, now of Nashua, in the county of Hillsborough and State of New Hampshire, have invented certain new and useful Improvements in Lamps, of which the following is a specification:

The main object of this invention is to burn with a flat wick hydrocarbon oils which are denser and of greater gravity than kerosene and other burning-fluids of like character, and which are non-explosive in their character, and therefore much safer than the last-named fluids, and, under certain conditions, can be employed very economically in the production of light with a lamp having a flat-wick burner.

The conditions which I have found necessary for the burning of these oils are—

First, two flat wicks placed each in a wick-tube of corresponding shape, the wick-tubes being placed with their flat sides toward each other, and at such distance apart as to leave a central passage, through which air may pass up between the two flames which rise from the burning wick. Second, an air-deflector or dome, arranged over the top of the wicks, and provided with a single slot, through which the products of combustion of both wicks must pass. Third, a lamp-chimney producing the draft needed for the proper combustion of the oil, effecting the thorough intermixture with the two flames of the air passing up through the central draft-passage, and causing them to be drawn together and condensed at the slot in the dome, through which they pass in the form of a single flame.

To successfully realize these conditions I have devised a lamp-burner containing the following elements in combination, namely: Two wick-tubes, with a draft-passage between them, an air-deflector or dome with a single slot, through which the flames from the two wicks pass in the form of a single flame, and a chimney-rest and other appliances for holding the chimney in place on the burner, substantially as hereinafter shown and described. With a burner of this kind any chimney of ordinary or suitable construction may be employed; and, indeed, the burner can be put into the market and sold like any other burner, requiring no special form of chimney differing from those already in common use. A burner made in accordance with the portion of my invention just specified is adapted to burn not only heavy oils, but also refined petroleum or kerosene, and like hydrocarbons. In burning fluids of varying densities it may be found desirable to provide means for varying the draft in accordance with the density of the fluid and the amount of oxygen required to support combustion. To this end, my invention further consists in the combination, with the two wick-tubes, of a single-slotted deflector, which can be adjusted to different heights above the wicks, and a valve located between the tubes for the purpose of regulating the amount of air passing up between them to the flames, as hereinafter described. My invention further has reference to means for simultaneously raising or lowering the wicks in the two wick-tubes; and, to this end, it consists in the combination, with the two wick-tubes, of shafts and wick-raising pinions, arranged substantially as hereinafter described, so that the pinions on one shaft may gear or engage directly with those on the other, whereby the turning of one shaft will put the other in revolution, and both sets of pinions will be caused to operate simultaneously upon the wicks, for the purpose of raising or lowering them, without the use of intermediate gearing.

Figure 2:
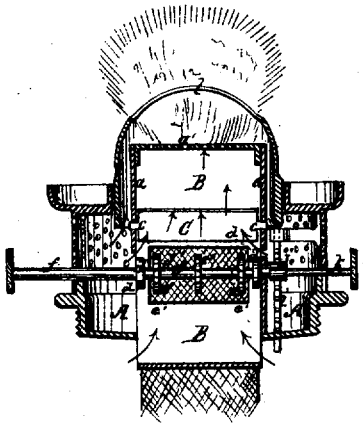

In the accompanying drawing I have represented one mode in which my invention may be carried into effect. Figure 1 is a vertical central section of a burner made in accordance with my invention. Fig. 2 is a like section of the same in a plane at right angles with the plane of section in Fig. 1.

A is the screw-threaded base of the burner, which is adapted to be screwed into the top of the lamp in the usual manner. B B are two flat-wick tubes, which are arranged with their flat sides toward each other, and with their lower ends extending through the base A. These tubes may be inclined with relation to each other, but in all cases there should be a space, *b*, left between them, through which air may pass between the flames which rise from the wicks in the tubes B B. Air is supplied to the interior of the burner through the air-distributing perforations in the side D of the burner, which serve to steady the draft and prevent the flame from flickering. Above the perforated sides of the burner are the chimney-rest *n* and chimney-holding device *n'*, of any ordinary or suitable construction. A dome or air-deflector, E, of the usual form, is supported at the proper distance above the wick-tubes in any suitable way, and is provided with a single oblong slot, *l*, which is located just over the wick-tubes or the central space between them. The position occupied by the chimney when placed on the burner is indicated in dotted lines in Fig. 1. The course of the air which enters through the perforated sides and passes up on the exterior of and between the flames is indicated by the arrows.

With an ordinary flat-wick lamp-burner having a single wick-tube it is not practicable to successfully burn heavy hydrocarbon oils to produce a good illuminating flame. But with a lamp-burner having the elements above named in combination a very brilliant light is produced with such oils, far exceeding in intensity the light produced by the ordinary kerosene-burner, at a cost little, if any, in excess of that incurred in using the latter burner, and, indeed, at a less cost than required to produce, with such a burner, a light at all approaching in intensity the light given by a burner made in accordance with my invention. When the chimney is in place and the wicks are lighted the air or draft passes both between and upon the exterior of the flames. The central draft supplies to the interior of the flame the oxygen needed for perfect combustion, and the exterior draft, passing up between the wick-tubes and the deflector to the slot *l*, forces together and condenses the two flames, thoroughly intermingling the central draft with them, and causing them to pass through and appear above the slot in the form of a single flame of large size, having an intensity greatly in excess of the combined intensity of the two wick-tubes, were they separate or were they to pass each in the form of a single flame through a separate slot formed in the deflector.

The perforated sides of the burner are held to the base by screws *h*, or are thereto attached in any other suitable manner. The space between the upper part of the tubes may be closed for a greater or lesser distance by the side plates *a*, which, together with the flat sides of the wick-tubes, form an air-chamber, through which the central draft passes on its way to the flames; and, if desired, the upper end of this chamber may be closed by wire-gauze or a perforated plate, *a'*, which will still further steady the draft. If it should be found necessary or desirable to regulate the supply of air passing up through the central draft-passage, I can employ a valve, C, provided with journals *c*, supported in the plates *a*, which can be turned so as to enlarge or contract the opening through which the air passes up to the flames. For the purpose or further regulating the draft the dome or deflector E may be arranged so that it can be adjusted up and down. An arrangement for this purpose is indicated in the drawing. The deflector fits within the annular chimney-rest, and is supported upon a rack-bar, *i*, which gears into a pinion, *j*, on a shaft, *k*, that passes out through the sides of the burner, as shown in Fig. 2. By turning this shaft the deflector can be raised or lowered at pleasure.

The wick-raising devices consist of the shafts *e f* and pinions or toothed wheels *e'*, these parts being of ordinary or suitable construction. In the present instance the shafts are arranged between the two wick-tubes, and supported in bearings *d* formed thereon, the shaft *f* being supported on one wick-tube, with its wheels engaging, through slots *f'*, with the wick therein, and the shaft *e* being supported in like manner on the other wick-tube. In order to cause one shaft to move in unison with the other and thus effect simultaneously the raising or lowering of the wicks in both tubes, I gear together the shafts, by means of one or more of the pinions or toothed wheels on one gearing or engaging directly with corresponding pinions on the other, thus effecting the object I have in view in a very simple manner, and without the use of gearing intermediate between the wheels which are mounted on the shafts. One of the shafts *f* is extended out through the sides of the burner, and is provided with the usual milled head, by which it may be turned. The revolution of this shaft will, of course, cause the corresponding movement of the other, and both wicks will, therefore, be raised or lowered in unison.

Having now described my invention and the manner in which the same is or may be carried into effect, I would say in conclusion, that I am aware that two wick-tubes have been used in one burner, both in an inclined and vertical position. I am also aware that it is not new to combine a double-slotted dome or deflector with two wick-tubes, the flame from each of which passes up through the deflector through its own slot, and distinct and separate from the other. But I am not aware that the elements hereinbefore first named—viz., a single-slotted deflector, two wick-tubes, and chimney supporting and holding appliances—have ever before been combined in a lamp-burner in the manner herein described; and it is in this combination that the chief characteristic of my invention is found, all of the three elements being essential to the realization of the object I have in view. I am also aware that it is not new to gear together two or more wick-raising shafts and pinions, so that, by turning one, all will be put in motion and revolve in unison; and this I do not claim broadly, or irrespective of the arrangement of these parts, so that the pinion or pinions on the one shaft shall engage directly with a corresponding pinion or pinions on the other without the employment of any gearing intermediate between the two.

What I claim as my invention, and desire to secure by Letters Patent, is—

1. The combination, in a lamp-burner, of the following elements, namely, two wick-tubes with a draft-passage between them, a deflector with a single slot, arranged so that the flames from the two wicks will pass through it in the form of a single flame, and appliances for holding the lamp-chimney in place, substantially as herein shown and described.

2. The combination, in a lamp-burner substantially such as described, of the two wick-tubes and the valve for regulating the supply of air which passes between said tubes to the flames, substantially as shown and set forth.

3. The combination, in a lamp-burner substantially such as described, of the two wick-tubes, the valve regulating the supply of air passing up between said tubes to the flames, and the dome adjustable to a greater or lesser height above the wick-tubes, substantially as shown and set forth.

4. The arrangement of the wick-raising devices, substantially as shown and described, so that one or more of the wheels or pinions on the one shaft may gear into or engage directly with a corresponding pinion or pinions in the other shaft, for the purposes stated.

In testimony whereof I have hereunto set my hand in the presence of two subscribing witnesses.

HALVOR HALVORSON.

Witnesses:
W. W. BAILEY,
A. MCKEAN.